A. W. CUMMINGS.
WATERING TANK AND HEATER.
APPLICATION FILED OCT. 7, 1921.
1,407,988.   Patented Feb. 28, 1922.
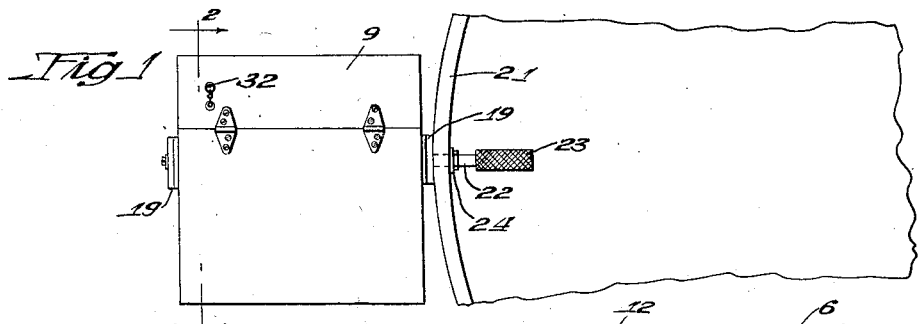
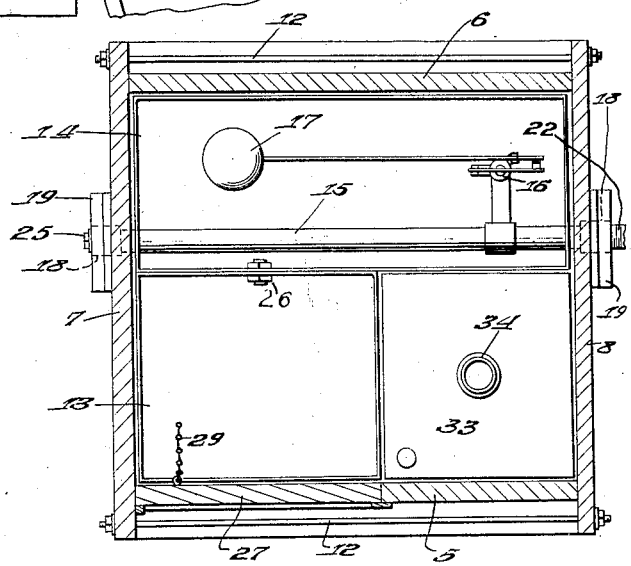
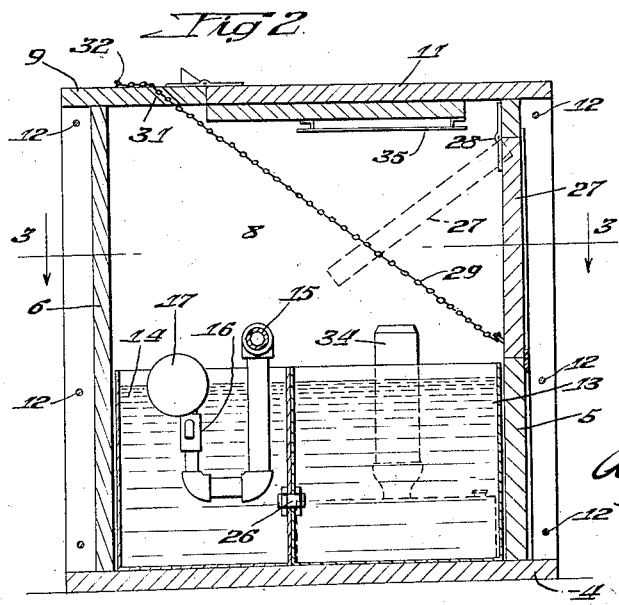

UNITED STATES PATENT OFFICE.

ARTHUR W. CUMMINGS, OF ROCKFORD, ILLINOIS.

WATERING TANK AND HEATER.

1,407,988.  Specification of Letters Patent.  Patented Feb. 28, 1922.

Application filed October 7, 1921. Serial No. 506,012.

*To all whom it may concern:*

Be it known that I, ARTHUR W. CUMMINGS, a citizen of the United States, residing at Rockford, in the county of Winnebago and State of Illinois, have invented certain new and useful Improvements in Watering Tanks and Heaters, of which the following is a specification.

This invention pertains in general to watering devices adapted for farm use for watering stock, and is especially adapted for hogs, sheep and poultry.

The primary object of the invention is to provide a water trough and heater adapted to be located at the outer side of and attached to a water tank and embodying means for maintaining a supply of water in a partly inclosed trough for continuous service through all the seasons. That is, my improved watering trough and heater is so constructed as to practically and effectually preclude freezing either in the trough or the connection with the main tank.

Another important object is the provision of a watering trough and heater constructed in such novel manner that it may be produced at a comparatively low cost so as to be well within the means of the average farmer and which may be operated at a very low cost and will give continuous service.

My improvements are also so designed as to be especially durable and serviceable and so as to be readily accessible for cleaning and for access to the heater.

Still another object is to provide a watering trough and heater so constructed that it may be shipped as a unit without crating and may be connected with equal facility at either of two sides to a main tank.

Other objects and attendant advantages will be appreciated by those familiar with this art as the invention becomes better understood by reference to the following description when considered in connection with the accompanying drawings, in which—

Figure 1 is a plan view of a watering trough and heater embodying my invention, shown in operative condition with a large tank;

Fig. 2, a vertical section through the watering trough taken on the line 2—2 of Fig. 1; and Fig. 3, a horizontal section taken on the line 3—3 of Fig. 2.

My invention comprehends the provision of a suitable housing, preferably formed of wood, comprising a bottom 4, front and back walls 5 and 6 respectively joined by side walls 7 and 8, and a sectional top comprising a fixed part 9 and a hinged part 11. The sides 7 and 8 extending beyond the front and back walls, are connected by tie rods 12 for reinforcing purposes.

Within this housing I have utilized the space in a novel and most advantageous manner for maintaining a continuous supply of water in a trough and for heating the water in cold weather to prevent freezing. To this end, I have provided a watering trough 13 and a supply trough 14, each comprising an individual tank or trough body. The tank body 14 extends from side to side of the housing and accommodates a float-actuated valve of conventional construction. A supply pipe 15 extends through the side walls 7 and 8 of the housing directly above the tank 14 and discharges into said tank through a valve 16 controlled by a float 17. Each end of the supply pipe 15 is equipped with a coupling 18 normally covered by a block 19. Either end of the pipe 15 may be connected to a larger tank as by positioning the housing alongside of a tank wall 21, as shown in Fig. 1, and securing it in position to said wall by means of a pipe connection 22 threadingly engaging the adjacent coupling 18. The end of the pipe 22 disposed within the main tank is equipped with a strainer inlet 23. A nut 24 on the pipe 22 may be drawn tight against the wall 21 for fixedly securing the trough housing in position alongside of the main tank, it being observed that the pipe connection between the main tank and the tank in the housing is effectually protected by the block 19 against freezing. A plug 25 closes the opposite end of the supply pipe 15. Manifestly, the watering device may be attached at either side to a main tank so as to best suit the conditions at hand.

The watering trough 13 occupies the remaining space between the tank 15 and the front wall 5 with the exception of space for a heater and is connected to said tank 15 by a pipe connection 26, which also provides a supply passage between the trough 13 and the tank. Access to the trough is had through a doorway in the front wall adapted to be closed by a door 27 hinged at its upper end 28. By means of a chain 29 connected to the inside of the door and passing through an opening 31 in the fixed part 9 of the top, the door may be swung inwardly by drawing the chain upwardly through the top. The door may be held in any open position by engaging the chain on a hook 32 on the top board 9.

The remaining rectangular space at the front of the housing is occupied by a heater comprising an oil tank 33 equipped with a conventional oil burning wick and a chimney 34. The hinged top 11 carries a baffle plate 35 positioned directly over the heater for deflecting the direct heat and to prevent burning the top.

It will be observed from the foregoing that the housing incloses a relatively small compartment which may be easily heated in cold weather to a degree sufficient for preventing the water from freezing, and that in view of the compactness of the parts within this housing permitting the reduction to a very small area to be heated, the fuel consumption will be correspondingly small. At the same time, sufficient water may be supplied to the drinking trough by reason of the automatic feed to serve the greatest needs for which a watering trough of this character may be required. By separating the trough 13 and the tank 14, dirt and other foreign matter is prevented from entering the supply tank from the drinking trough. In cold weather the door 27 will be left closed in order to conserve and retain the heat. This however, will not interfere with the use of the trough as the stock being in the habit of drinking through this opening will push the door open to get to the trough. The door will return by gravity to the closed position. The trough 13 may be removed through the open top of the housing independently of the tank 14, for purpose of cleaning. To this end it is only necessary to close the valve 16 and remove the nut at the trough side of the coupling 26. The housing with contents properly secured therein and the hinged top temporarily nailed down or otherwise secured in the closed position, may be shipped without crating. It will be evident, therefore, that I have produced a complete unitary article of manufacture so designed as to be thoroughly practical for the service requirements of a device of this kind and which is of such simple construction as to be capable of production and sale at a comparatively low cost. It should be understood, however, that considerable change might be made in details of construction without departing from the spirit and scope of the invention as expressed in the appended claims; in which—

I claim:

1. A watering trough and heater of the character described comprising a housing rectangular in horizontal section, a water supply tank positioned within said housing adjacent to its back wall and extending from side to side thereof leaving an unoccupied floor space from side to side between said tank and the front of the housing, a water trough and a heater positioned side by side in said space, the front wall of the housing having an opening in front of said trough, a door adapted for closing said opening, water supply means within said supply tank for maintaining the water at a given level therein, and a water supply connection between said tank and the trough.

2. A watering trough and heater comprising a housing defined by a bottom, front and back walls, side walls and a top including a hinged section, a water supply tank within said housing at the back thereof and reaching from side to side, a water trough within said housing adjacent to one side wall and between the front of the supply tank and the front wall, leaving an unoccupied floor space adjacent to the other side wall and in front of the supply tank, a heater positioned in said unoccupied space, the front wall of the housing having a doorway immediately in front of the water trough, a door adapted for closing said doorway, a water supply pipe entering the supply tank, means for automatically maintaining the water delivered through said pipe at a given level in the tank, and a water supply connection between said tank and the trough.

3. A watering trough of the character described comprising a housing, a water supply pipe extending through opposite walls of the housing, a coupling on each end of said pipe for connecting either end thereof to a main tank, a block embracing each coupling and secured to the exterior of the housing, a plug adapted for closing either coupling, an inlet pipe adapted for connection to the other coupling and for passage through a side wall of a main tank, means within the housing for regulating the flow of water delivered through said supply pipe, and a water trough within the housing, the housing having an opening providing access to said trough.

4. A watering trough and heater of the character described comprising a housing, a water supply tank positioned in said housing at the rear thereof, a water trough and a heater positioned within said housing in side by side relation at the front of said tank, means within said tank for supplying water thereto and maintaining it at a given level, a water supply connection between said tank and said trough, the front wall of the housing having an opening in front of said trough providing access thereto for watering, a door for said opening hinged at its top to the front wall, the top of the housing being closed by a fixed rear section and a hinged front section, and a flexible connection attached to the lower end of the door and passing through said fixed top section, whereby the door may be opened from the top of the housing.

5. A watering trough and heater comprising a housing containing a watering trough and a heater, a water supply pipe arranged within the housing so that its ends extend through walls at different sides of the housing, a coupling on each end of said pipe, a pipe connection adapted to pass through the side wall of a main tank and to be threadingly connected to either one of said couplings according to the location of the housing with respect to the main tank, a plug for closing the other coupling, a strainer inlet for the end of said pipe connection within the main tank, and means within the housing connected with said supply pipe for regulating the flow of water through said pipe and for maintaining the water at a given level in the trough.

6. A watering trough and heater of the character described comprising a housing, a water supply tank positioned in said housing at the rear thereof, a water trough and heater positioned within said housing in side by side relation at the front of said tank, means within said tank for supplying water thereto and maintaining it at a given level, means for permitting flow of water from said tank to the trough, the front wall of the housing having an opening in front of said trough providing access thereto for watering, a door for said opening hinged at its top to the front wall, and a flexible connection attached to the lower end of the door and extending through the housing to the exterior thereof and adapted to be actuated for regulating the position of the door.

ARTHUR W. CUMMINGS.